(12) United States Patent
Mo

(10) Patent No.: US 12,033,671 B2
(45) Date of Patent: Jul. 9, 2024

(54) VIDEO GENERATION METHOD AND APPARATUS, ELECTRONIC DEVICE, AND STORAGE MEDIUM

(71) Applicant: Beijing Zitiao Network Technology Co., Ltd., Beijing (CN)

(72) Inventor: Weishu Mo, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/352,643

(22) Filed: Jul. 14, 2023

(65) Prior Publication Data

US 2023/0368817 A1  Nov. 16, 2023

Related U.S. Application Data

(63) Continuation of application No. PCT/CN2022/070919, filed on Jan. 10, 2022.

(30) Foreign Application Priority Data

Jan. 15, 2021  (CN) .......................... 202110057581.2

(51) Int. Cl.
  *G11B 27/036*  (2006.01)
  *G06F 16/683*  (2019.01)
  *G11B 27/34*  (2006.01)

(52) U.S. Cl.
  CPC .......... *G11B 27/036* (2013.01); *G06F 16/683* (2019.01); *G11B 27/34* (2013.01)

(58) Field of Classification Search
  CPC ...... G11B 27/036; G11B 27/34; G06F 16/683

USPC .................................................. 386/278, 282
See application file for complete search history.

(56) References Cited

U.S. PATENT DOCUMENTS

| 10,089,392 B2 * | 10/2018 | Luo .......................... G06F 16/78 |
| 10,122,983 B1 | 11/2018 | Ross et al. |
| 2005/0084232 A1 * | 4/2005 | Herberger .............. G11B 27/34 |
| | | 386/282 |
| 2017/0092331 A1 | 3/2017 | Eppolito et al. |
| 2018/0295427 A1 | 10/2018 | Leiberman et al. |

(Continued)

FOREIGN PATENT DOCUMENTS

| CN | 102256030 A | 11/2011 |
| CN | 103793446 A * | 5/2014 ............. G06F 16/44 |
| CN | 103793446 A | 5/2014 |

(Continued)

OTHER PUBLICATIONS

International Search Report dated Mar. 14, 2022 for International Application No. PCT/CN2022/070919, English translation (5 pages).

(Continued)

*Primary Examiner* — Thai Q Tran
*Assistant Examiner* — Stephen R Smith

(57) ABSTRACT

A video generation method includes receiving a first trigger operation of generating a video using target music; and in response to the first trigger operation and according to first music feature information of the target music, selecting candidate material matching the target music from a candidate material set of a user as target candidate material, and generating a target video according to the target candidate material. The target video uses the target music as background music.

17 Claims, 12 Drawing Sheets

---

S101: Receive a first trigger operation of generating a video using target music S102: In response to the first trigger operation, select candidate material matching the target music from a candidate material set of a user according to first music feature information of the target music, use the candidate material as target candidate material, and generate the target video according to the target candidate material, where the target video uses the target music as background music

(56) References Cited

U.S. PATENT DOCUMENTS

| | | | | |
|---|---|---|---|---|
| 2018/0330756 | A1* | 11/2018 | MacDonald | G06F 16/951 |
| 2021/0272599 | A1* | 9/2021 | Patterson | G06N 3/045 |

FOREIGN PATENT DOCUMENTS

| | | | | | |
|---|---|---|---|---|---|
| CN | 107483843 | A | | 12/2017 | |
| CN | 108900768 | A | | 11/2018 | |
| CN | 110519638 | A | | 11/2019 | |
| CN | 110933487 | A | | 3/2020 | |
| CN | 111274415 | A | | 6/2020 | |
| CN | 111526427 | A | | 8/2020 | |
| CN | 111625685 | A | | 9/2020 | |
| CN | 111683209 | A | | 9/2020 | |
| CN | 111835986 | A | | 10/2020 | |
| CN | 111835986 | A | * | 10/2020 | G10L 25/51 |
| CN | 111866585 | A | * | 10/2020 | H04N 21/44 |
| CN | 111866585 | A | | 10/2020 | |
| CN | 111930994 | A | | 11/2020 | |
| CN | 111935537 | A | | 11/2020 | |
| CN | 112203140 | A | | 1/2021 | |
| CN | 112911379 | A | | 6/2021 | |
| EP | 3038108 | A1 | | 6/2016 | |
| KR | 20140126556 | A | | 10/2014 | |
| KR | 102194281 | B1 | | 12/2020 | |

OTHER PUBLICATIONS

First Office Action dated May 7, 2022 in Chinese Application No. 202110057581.2, English translation (12 pages).
Second Office Action dated Nov. 16, 2022 in Chinese Application No. 202110057581.2, English translation (13 pages).
EP Search Report issued in EP Appl. No. 22738945.9 dated May 6, 2024 (4 pages).
Ui Cai et al: "Automated Music Video Generation using WEB Image Resource", IEEE International Conference on Acoustics, Speech and Signal ProcessingICASSP 2007, Apr. 15-20, 2007, Honolulu, Hawaii, USA, Proceedings, IEEE, US, vol. 2, Jan. 1, 2007, pp. II-737.

* cited by examiner

VIDEO GENERATION METHOD AND APPARATUS, ELECTRONIC DEVICE, AND STORAGE MEDIUM

CROSS-REFERENCE TO RELATED APPLICATION(S)

This is continuation of International Patent Application No. PCT/CN2022/070919, filed on Jan. 10, 2022, which is based on and claims priority to Chinese Patent Application No. 202110057581.2 filed with the China National Intellectual Property Administration (CNIPA) on Jan. 15, 2021, the disclosure of which is incorporated herein by reference in its entirety.

TECHNICAL FIELD

The present disclosure relates to the field of computer technology, for example, a video generation method and apparatus, an electronic device, and a storage medium.

BACKGROUND

Short video application software typically provides users with functions of creating and publishing a short video.

When a user creates a video, it is generally necessary to first manually shoot or select video material, set an arrangement sequence of multiple pieces of video material, set appropriate background music for selected video material, and then synthesize the selected material and the background music into a video by short video application software.

However, in the related art, the creation threshold of a short video is high, and it takes a long time for creating the short video. As a result, the user's creation experience is poor.

SUMMARY

The present disclosure provides a video generation method and apparatus, an electronic device, and a storage medium to reduce the creation threshold of a short video and shorten the time required for creating the short video.

The present disclosure provides a video generation method. The method includes the steps below.

A first trigger operation of generating a video using target music is received.

In response to the first trigger operation, candidate material matching the target music is selected from a candidate material set of a user and according to first music feature information of the target music and the selected candidate material is used as target candidate material. The target video is generated according to the target candidate material. The target video uses the target music as background music.

The present disclosure also provides a video generation apparatus. The apparatus includes a first receiving module and a video generation module.

The first receiving module is configured to receive the first trigger operation of generating the video using the target music.

The video generation module is configured to, in response to the first trigger operation, select the candidate material matching the target music from the candidate material set of the user according to first music feature information of the target music, use the candidate material as the target candidate material, and generate the target video according to the target candidate material.

The present disclosure also provides an electronic device. The device includes one or more processors and a storage apparatus.

The memory is configured to store one or more programs.

When executing the one or more programs, the one or more processors perform the preceding video generation method.

The present disclosure also provides a computer-readable storage medium. The storage medium stores a computer program. When executing the computer program, a processor performs the preceding video generation method.

DETAILED DESCRIPTION

Embodiments of the present disclosure are described below with reference to the drawings. The drawings illustrate some embodiments of the present disclosure, but it is to be understood that the present disclosure may be implemented in various manners and should not be limited to the embodiments set forth herein. These embodiments are provided for a thorough and complete understanding of the present disclosure. The drawings and embodiments of the present disclosure are merely illustrative.

The various steps recited in method embodiments of the present disclosure may be performed in a different order and/or in parallel. In addition, the method embodiments may include additional steps and/or omit execution of illustrated steps. The scope of the present disclosure is not limited in this respect.

As used herein, the term "include" and variations thereof are intended to be inclusive, that is, "including, but not limited to". The term "according to" is "at least partially according to". The term "one embodiment" means "at least one embodiment"; the term "another embodiment" means "at least one another embodiment"; and the term "some embodiments" means "at least some embodiments". Related definitions of other terms are given in the description hereinafter.

Concepts such as "first" and "second" in the present disclosure are merely intended to distinguish one from another apparatus, module or unit and are not intended to limit the order or interrelationship of the functions performed by the apparatus, module or unit.

References to modifications of "one" or "a plurality" mentioned in the present disclosure are intended to be illustrative and not limiting; and those skilled in the art should understand that "one" or "a plurality" should be understood as "one or more" unless expressed in the context.

The names of messages or information exchanged between multiple apparatuses in the embodiments of the present disclosure are only for illustrative purposes and are not intended to limit the scope of such messages or information.

Figure 1:
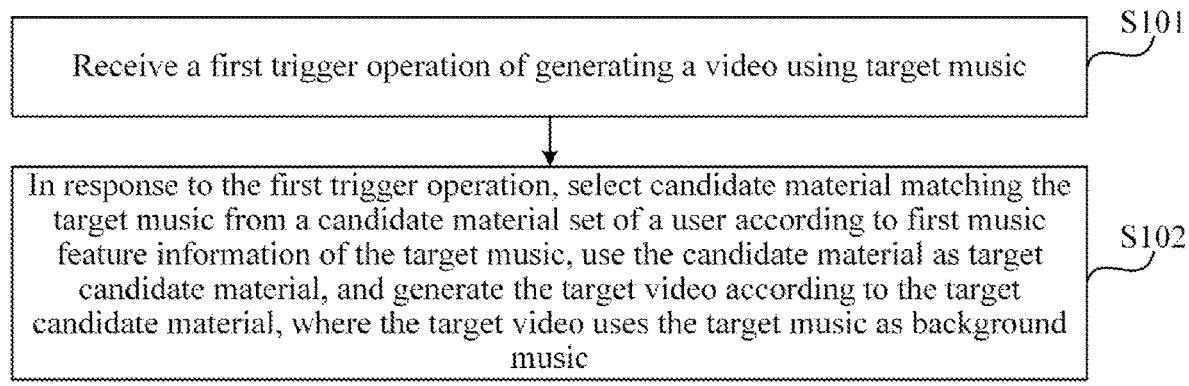
FIG. 1 is a flowchart of a video generation method according to an embodiment of the present disclosure.

FIG. 1 is a flowchart of a video generation method according to an embodiment of the present disclosure. This method may be executed by the video generation apparatus. The apparatus may be performed by software and/or hardware and may be configured in an electronic device. For example, the apparatus may be configured in a mobile phone or a tablet computer. The video generation method provided in this embodiment of the present disclosure is applicable to a scene in which a video is automatically generated and is particularly applicable to a scene in which a music video is automatically generated. As shown in FIG. 1, the video generation method according to this embodiment may include the steps below.

In S101, a first trigger operation of generating a video using target music is received.

The first trigger operation may be understood as a trigger operation for instructing the electronic device to automatically generate a video using music, for example, a trigger operation of clicking a video generation control. The video generation control may be displayed in a page such as a music list page, a music detail page, a video playing page, and/or a video playing page. Accordingly, the target music may be music that a user wants to use as background music to create a video, such as music in a selected state on the music list page when the user executes the first trigger operation, music corresponding to the music detail page, music currently played on the music playing page, or background music used for the video currently played on the video playing page. Description is given by using an example in which the first trigger operation is used as the trigger operation for the video generation control on the music detail page.

Figure 2:
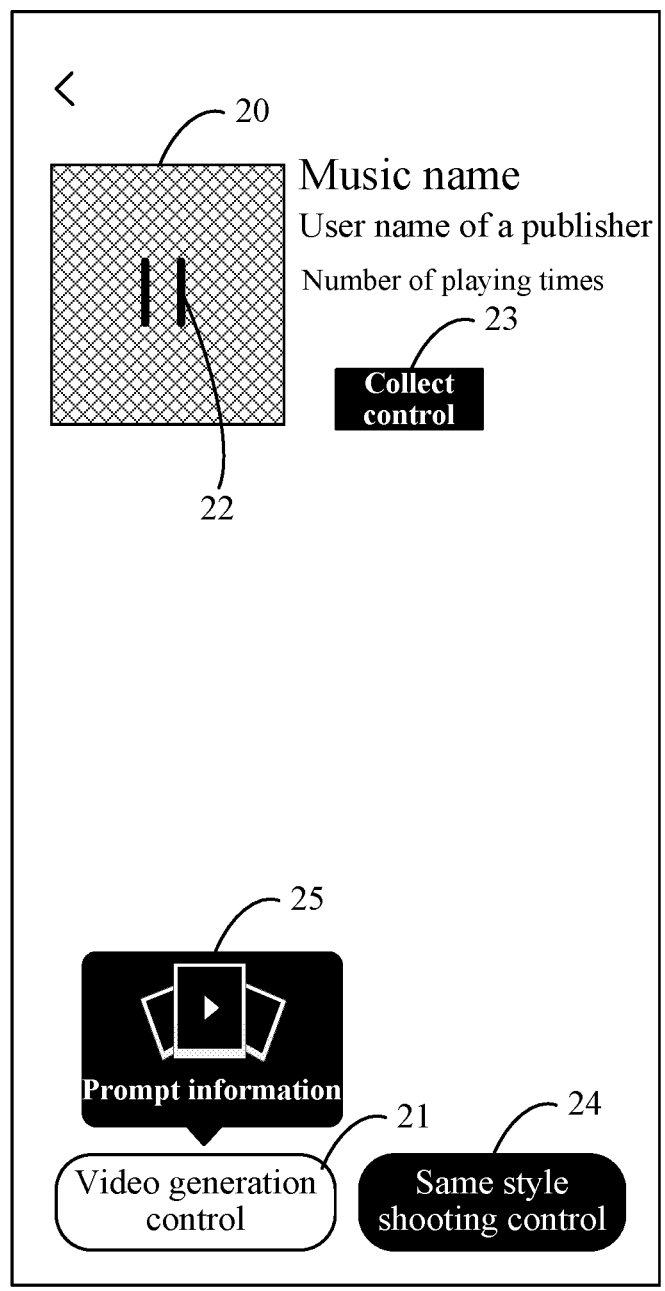
FIG. 2 is a diagram of a music detail page according to an embodiment of the present disclosure.

In this embodiment, as shown in FIG. 2, the music detail page of music may display the music information of the music (such as a music cover 20 of the music, a music name of the music, a user name of a publisher of the music, and the number of playing times of the music) and a video generation control 21, so that the user instructs the electronic device to automatically generate a video that uses the music as background music by triggering the video generation control 21, for example, generate a music video that uses the music as background music. A play/pause control 22, a collection control 23, and/or a same style shooting control 24 may also be disposed, so that the user may instruct the electronic device to play/pause the music by clicking the play/pause control 22 and collect the music by clicking the collection control 23, and/or instruct the electronic device to switch the current display page from the music detail page of the music to the video shooting page by clicking the same style shooting control 24 and to turn on a camera so that the user may shoot a video that uses the music as background music. In addition, when the user enters the music detail page for the first time, the music detail page may also display prompt information 25 for the video generation control 21, such as animations, pictures, and/or text used for the prompt, so that the user can clarify the function of the video generation control 21.

For example, the electronic device displays a music detail page of the music. When the user wants to instruct the electronic device to automatically generate a video by using the music, the user may click the video generation control displayed on the music detail page. Accordingly, when the electronic device monitors that the user clicks the video generation control in the music detail page, the electronic device may determine the music corresponding to the music detail page as the target music and it is determined that the first trigger operation of generating a video using the target music is received.

When the user clicks the video generation control for the first time, and/or when the user does not open the authority to access the user's material, the electronic device may also display a corresponding window to inform the user that the user's material may be read and/or to prompt the user to open the authority to access the user's material. At this time, accordingly, the first trigger operation may also be an operation of triggering a corresponding control in the displayed window.

Figure 3:
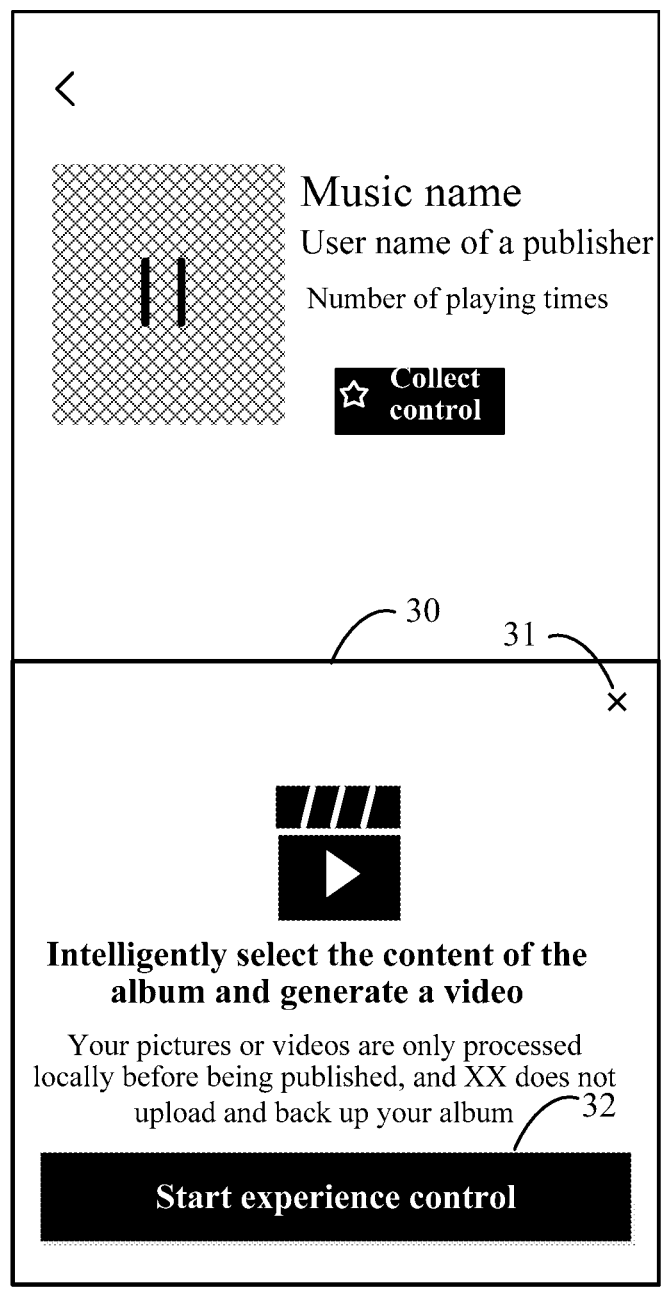
FIG. 3 is a diagram of a material notification window according to an embodiment of the present disclosure.
Figure 4:
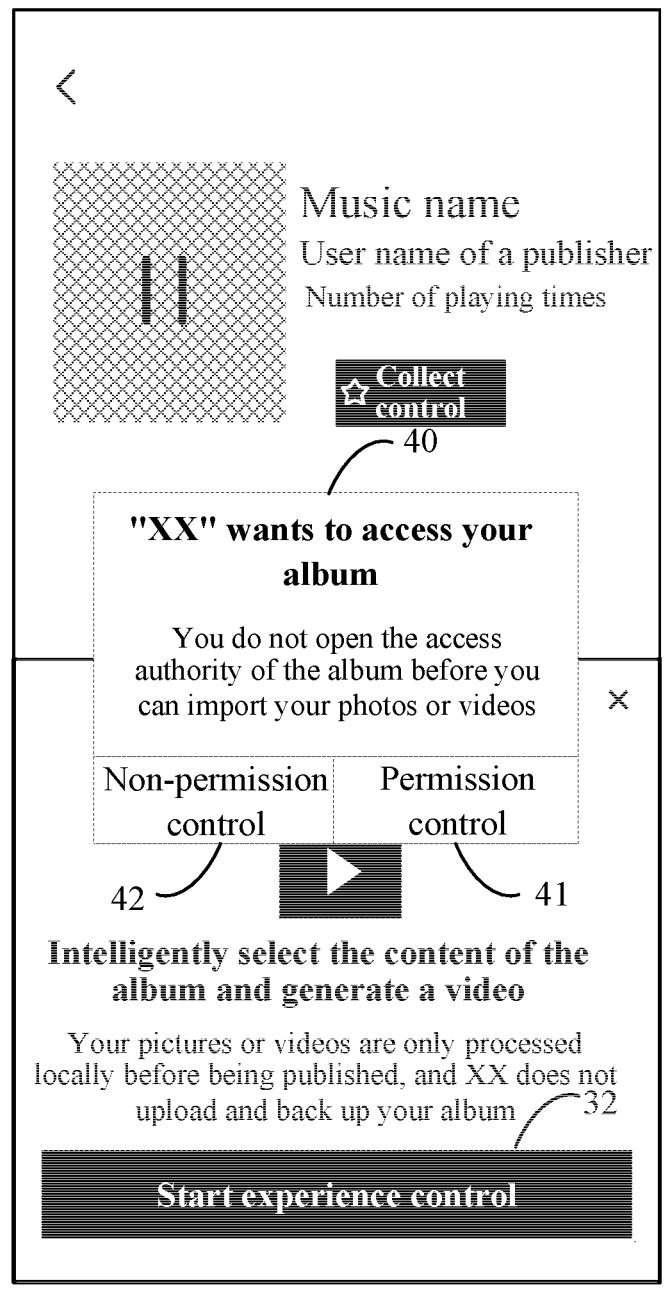
FIG. 4 is a diagram of an authority opening window according to an embodiment of the present disclosure.

For example, as shown in FIG. 2, the electronic device displays the music detail page of the music. When the electronic device monitors that the user clicks the video generation control 21 in the music detail page, the electronic device determines whether the user clicks the video generation control 21 for the first time. If the user clicks the video generation control 21 for the first time, a material notification window 30 is displayed. As shown in FIG. 3, when the user is informed through the material notification window 30 that the user's material may be read when the video is automatically generated. When the electronic device monitors that the user clicks a close control 31 in the material notification window 30, the material notification window 30 is stopped from being displayed. When the electronic device monitors that the user clicks a start experience control 32 in the material notification window 30, whether the user opens the authority to access the user's material is determined. Accordingly, if the user does not click the video generation control 21 for the first time, whether the user opens the authority to access the user's material may be directly determined. In this manner, when it is determined that the user opens the authority to access the user's material, it may be determined that the first trigger operation is received. When it is determined that the user does not open the authority to access the user's material, as shown in FIG. 4, the authority opening window 40 may be displayed to prompt the user to open the authority to access the user's material. When it is monitored that the user clicks a permission control 41 in an authority opening window 40, the authority to access the user's material is opened, and it is determined that the first trigger operation is received. When it is monitored that the user clicks a non-permission control 42 in an authority opening window 40, the authority prompt window 40 is stopped from being displayed.

In S102, in response to the first trigger operation, candidate material matching the target music is selected from a candidate material set of the user according to first music feature information of the target music and used as target candidate material, and the target video is generated according to the target candidate material. The target video uses the target music as the background music.

The first music feature information may be the music feature information of the target music, such as lyrics information, rhythm information, and/or music style information of the target music. The target video may be understood as a video generated by the electronic device using the target music. The candidate material may be understood as material available to the electronic device to generate the target video. The candidate material may be all material in the user's local album and/or a cloud album or may be part of the material in the user's local album and/or the cloud album, for example, material of a high shooting quality in the user's local album and/or the cloud album. The material may include pictures and/or videos. In an embodiment, the material includes pictures and videos. The material may be obtained by the user in advance through shooting, downloading, importing, taking screenshots, or recording.

When the electronic device receives the first trigger operation, the electronic device acquires the candidate material set of the user, selects the candidate material matching the target music from the candidate material set according to the first music feature information of the target music and a preset selection rule, uses the candidate material as the target candidate material, and synthesizes all selected target candidate material into the target video. In this manner, the user may automatically generate the target video only by selecting the target music. For example, when the user watches a video, if the user prefers the background music in the video, the user only needs to switch the current display page to the video detail page of the background music and click the video generation control in the video detail page to generate a video that uses the background music as background music. The user does not need to select a video template and video material. In this manner, the difficulty in creating a video can be reduced, and the time required for creating the video by the user can be shortened. Thus, the selection rule of the target candidate material may be set by a developer according to requirements. For example, candidate material having an image style similar to the first music feature information may be selected and used as the target candidate material according to the first music feature information of the target music. Alternatively, a video template in which second music feature information of the background music matches the first music feature information of the target music is used as the target video template, and candidate material whose material theme is similar to the material theme of the target video template is selected and used as the target candidate material. This is not limited in this embodiment.

In an embodiment, to improve the quality of the generated target video, the candidate material in the candidate material set may be material of a good shooting quality in the user's local album and/or the cloud album. For example, before the candidate material matching the target music is selected from the candidate material set of the user and used as the target candidate material, the method also includes acquiring material in the album of the user, where the album includes a local album or an associated cloud album; and selecting multiple pieces of material from the album according to an aesthetic score of material to form the candidate material set of the user.

The associated cloud album may be understood as a cloud album associated with the account that the user is logged on to. The album from which the user acquires material may include the user's local album and/or the user's associated cloud album. When the user does not have the associated cloud album, or the user does not open the authority to access the cloud album, the album may include only the local album, that is, the electronic device may acquire only the material in the user's local album. When the user has the associated cloud album, and the user opens the authority to access the cloud album, the album may include the local album and the associated cloud album, that is, the electronic device may acquire the material in the user's local album and the material in the user's associated cloud album.

For example, the electronic device may first acquire all the material in the user album and perform an aesthetic evaluation on all the material according to a preset aesthetic evaluation rule or a pre-trained aesthetic evaluation model to obtain the aesthetic scores of all the material. Then, material whose aesthetic score is greater than a preset score threshold value is selected and used as the candidate material. Alternatively, a preset number (such as 30 or 50) of material is selected and used as candidate material in descending order of the aesthetic scores to constitute the candidate material set of the user.

In the preceding embodiment, the occasion at which the electronic device acquires the material in the user's album and constructs the candidate material set according to the aesthetic scores of all the material may be flexibly set according to requirements. For example, when the electronic device receives the first trigger operation, the electronic device may perform the preceding operations. When the application software to which the target music belongs starts, at a preset time (for example, 10 s) after the application software to which the target music belongs starts, or when it is monitored that the user starts the camera of the electronic device through the application software to which the target music belongs, the preceding operations may be performed.

In the video generation method according to this embodiment, the first trigger operation of generating the video using the target music is received. In response to the first trigger operation, the candidate material matching the target music is selected from the candidate material set of the user according to the first music feature information of the target music and the candidate material is used as the target candidate material. The target video that uses the target music as the background music is generated according to the target candidate material. In the preceding technical solutions adopted by this embodiment, a video may be automatically generated according to the music selected by the user by using the material matching the music. In this manner, the creation threshold of a video can be reduced, and the time required for creating the video by the user can be shortened. Moreover, the matching degree between the generated video and the music selected by the user can be improved, and the quality of the generated video can be improved.

Figure 5:
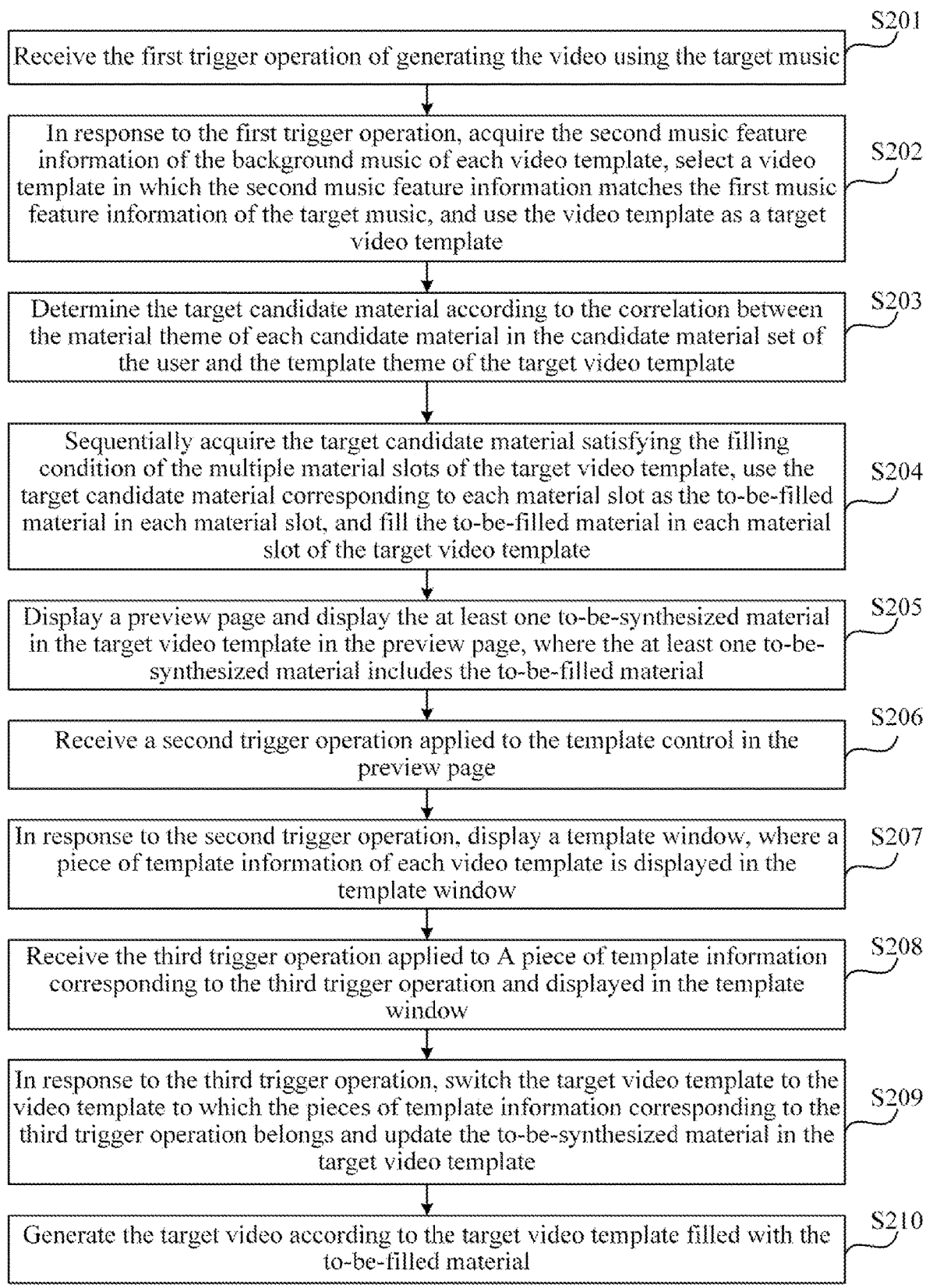
FIG. 5 is a flowchart of another video generation method according to an embodiment of the present disclosure.

FIG. 5 is a flowchart of another video generation method according to an embodiment of the present disclosure. The solutions in this embodiment may be combined with one or more optional solutions in the preceding embodiment. Optionally, the candidate material matching the target music is selected from the candidate material set of the user according to the first music feature information of the target music and the candidate material is used as the target candidate material in the following manners: Second music feature information of the background music of each of multiple video templates is acquired, and a video template is selected from the multiple video templates and used as a target video template, where second music feature information in the selected video template matches the first music feature information of the target music; and the target candidate material is determined according to a correlation between the material theme of each candidate material in the candidate material set of the user and the template theme of the target video template.

Optionally, the target video template includes multiple material slots for filling material. After the target candidate material is determined according to the correlation between the material theme of each candidate material in the candidate material set of the user and the template theme of the target video template, the method also includes sequentially acquiring target candidate material satisfying filling condition of the multiple material slots of the target video template, using target candidate material corresponding to each material slot as to-be-filled material in each material slot, and filling the to-be-filled material in each material slot of the target video template. The target video is generated according to the target candidate material in the following manner: The target video is generated according to the target video template filled with the to-be-filled material.

Optionally, after the to-be-filled material is filled in each material slot, the method also includes displaying a preview page and displaying at least one to-be-synthesized material in the target video template in the preview page. The at least one to-be-synthesized material includes the to-be-filled material. Optionally, after the preview page is displayed, the method also includes receiving a second trigger operation applied to a template control in the preview page; in response to the second trigger operation, displaying a template window, where a piece of template information of each video template is displayed in the template window; receiving a third trigger operation applied to a piece of template information corresponding to the third trigger operation and displayed in the template window; and in response to the third trigger operation, switching the target video template to a video template to which the piece of template information corresponding to the third trigger operation belongs and updating the to-be-synthesized material in the target video template.

Accordingly, as shown in FIG. 5, the video generation method according to this embodiment may include the steps below.

In S201, the first trigger operation of generating the video using the target music is received.

In S202, in response to the first trigger operation, the second music feature information of the background music of each video template is acquired, and the video template in which the second music feature information matches the first music feature information of the target music is selected and used as the target video template.

A video template may be understood as a template for creating a video. The second music feature information may be the music feature information of the background music to be added to the video template, such as the rhythm information and/or music style information of the background music.

Figure 6:
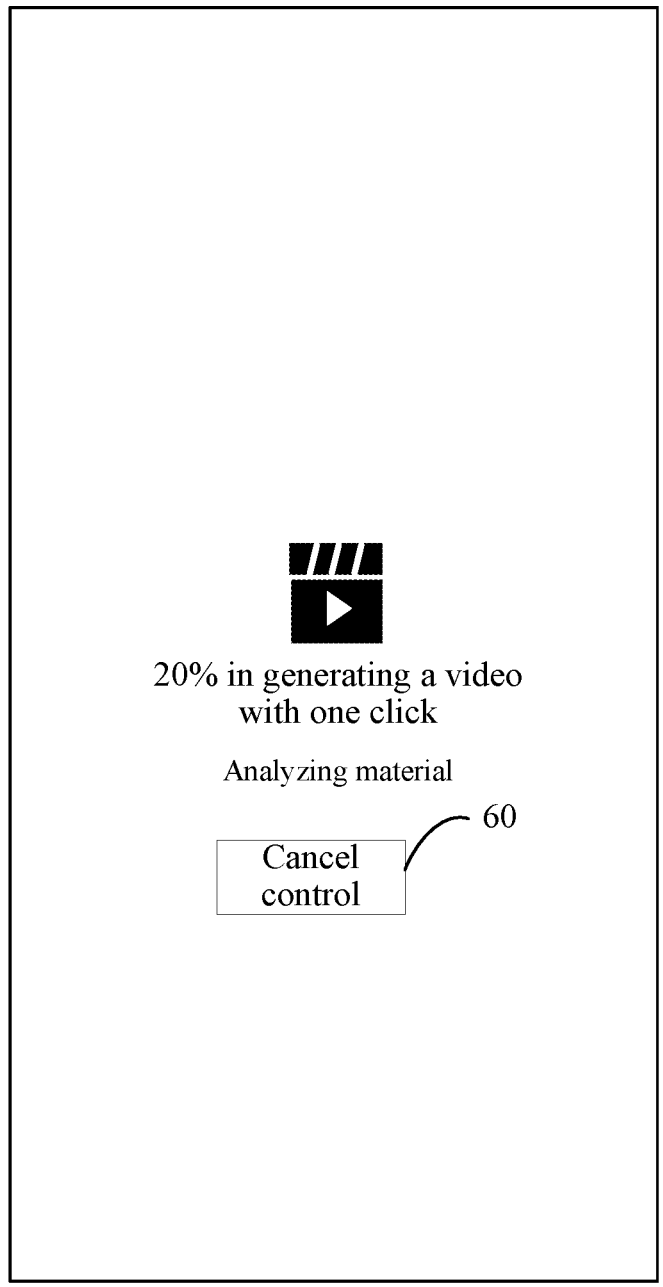
FIG. 6 is a diagram of a loading page according to an embodiment of the present disclosure.

For example, when the electronic device receives the first trigger operation, the electronic device may switch the current display page from the music detail page to a loading page. As shown in FIG. 6, the second music feature information of the background music of each video template is acquired, and a video template in which the music feature information of the background music matches the music feature information of the target music is selected and used as the target video template.

In this embodiment, as shown in FIG. 6, the loading page may display the current loading progress and a cancel control 60. In this manner, the user may instruct the electronic device to stop performing the subsequent operation by triggering the cancel control 60 and switch the current display page from the loading page back to the music detail page of the target music. The determination mode of the target video template may be set according to requirements. For example, when the electronic device determines the target video template, the electronic device may directly calculate the matching degree between the second music feature information of the background music of each video template in a template library and the first music feature information of the target music by using a preset matching degree calculation rule or a pre-trained matching degree calculation model, select the video template with the highest matching degree, and use the video template as the target video template. It is also possible to first determine whether there is a video in which the target music is used as the background music, and the video template is used when a video is generated among the videos published by the user who performed the first trigger operation and/or other users. If there is a video in which the target music is used as the background music and the video template is used when the video is generated, the video template used by the video is acquired and used as the target video template. If there is no video in which the target music is used as the background music and the video template is used when the video is generated, the matching degree between the second music feature information of the background music of each video template in the template library and the first music feature information of the target music is calculated, and the video template with the highest matching degree is selected and used as the target video template.

In addition, when there are multiple templates used for the video in which target background music is used as background music, or when there are multiple video templates having the highest matching degree, a video template may be randomly selected and used as the target video template, or a video template that best matches the personalized information of the user may be selected and used as the target video template according to the personalized information of the user, such as the video style of the video published and/or played by the user. Alternatively, when the target video template is determined, it is also possible to select a preset number (such as 5 or 10) of video templates according to the video using the target music as the background music or the matching degree between the music feature information of the background music of each template and the music feature information of the target music. The video template that best matches the personalized information of the user may be selected from the preset number of video templates and used as the target video template. In this manner, the generated target video more satisfies the personalized requirements of the user, and the user experience is improved.

In S203, the target candidate material is determined according to the correlation between the material theme of each candidate material in the candidate material set of the user and the template theme of the target video template.

The material theme may be understood as the theme of material, for example, the theme of the candidate material in the candidate material set. The material theme may be determined according to the image content of the material. The template theme may be understood as the theme of a video template, for example, the theme of the target video template. The theme of a material/video template may be, for example, a plant, a building, a landscape, a character, travel, or delicious food.

In this embodiment, material whose material theme in the candidate material set is similar to the template theme of the target video template (for example, the matching degree is greater than a preset matching degree threshold value) may be selected and used as the target candidate material according to the template theme of the target video template. The candidate material set may be divided into multiple candidate material subsets having different material themes according to the material theme of each candidate material in advance. In this manner, after the target video template is determined, the candidate material in a candidate material subset whose material theme is similar to the template theme of the target video template may be selected and used as the target candidate material. Thus, when the target candidate material is selected, all candidate material whose material themes are similar to the template theme of the target video template may be determined as the target candidate material. A preset number (such as 20 or 50) of candidate material whose material themes are similar to the template theme of the target video template may be selected and used as the target candidate material. This is not limited in this embodiment.

In S204, target candidate material satisfying the filling condition of the multiple material slots of the target video template is sequentially acquired and target candidate material corresponding to each material slot is used as the to-be-filled material in each material slot. The to-be-filled material is filled in each material slot of the target video template. The target video template includes multiple material slots for filling material.

The filling condition may include the aspect ratio (for example, 16:9) of the required filling material, the type of the material (for example, a video or picture), and/or the maximum duration of the material.

For example, the filling condition is the aspect ratio of the material. After the electronic device determines the target candidate material, a material slot of the target video template may be selected and used as the current material slot. For example, the first material slot of the target video template is selected and used as the current material slot. From the target candidate material that is not determined to be the to-be-filled material, target candidate material that satisfies the aspect ratio requirement of the current material slot is selected and used as the to-be-filled material of the current material slot. The to-be-filled material is filled in the current material slot. The next material slot of the target candidate material is determined as the current material slot, and the similar process described hereinabove is perform to select target candidate material of the current material slot until the next material slot does not exist.

In this step, when there is only one piece of target candidate material satisfying the filling condition of the current material slot, the one piece of target candidate material may be determined as the to-be-filled material in the material slot. When there are multiple pieces of target candidate material satisfying the filling condition of the current material slot, at least one piece of target candidate material of a video type may be randomly selected from the multiple pieces of target candidate material and used as the to-be-filled material of the current material slot to improve the quality of the generated target video. When no target candidate material of a video type exists in the multiple pieces of target candidate material, target candidate material may be randomly selected and used as the to-be-filled material of the current material slot. In addition, if the to-be-filled material is target candidate material of a video type whose duration is greater than the maximum duration of the material that can be filled in the current material slot, when the to-be-filled material is filled in the current material slot, a key video whose duration satisfies the maximum duration may be intercepted from the to-be-filled material, and the intercepted key video is filled in the current material slot.

When loading fails, for example, when the target video template cannot be loaded normally due to network reasons, or when the number of pieces of material whose material themes are similar to the template theme of the target video template is too small (for example, less than the number of material slots included in the target video template), or there is no target candidate material which satisfies the filling condition of one or more material slots, the electronic device may stop loading, switch the current display page from the loading page back to the music detail page of the target music, and prompt the user that loading fails, for example, prompt the user that "failed to complete the video, please try again later", or "insufficient material, please add and try again", so that the user can clarify the reason for the video generation failure.

In S205, the preview page is displayed, and the at least one to-be-synthesized material in the target video template is displayed in the preview page.

The at least one to-be-synthesized material includes the to-be-filled material. The at least one to-be-synthesized material may be understood as the material synthesized as the target video by the user in the target video template (such as a video or picture). The at least one to-be-synthesized material may include to-be-filled material filled in each material slot in the target video template and may also include transition material. The transition material may be carried in the target video template or may be generated by the electronic device according to adjacent pieces of to-be-filled material and filled between the adjacent pieces of to-be-filled material after the to-be-filled material is filled in the target video template.

Figure 7:
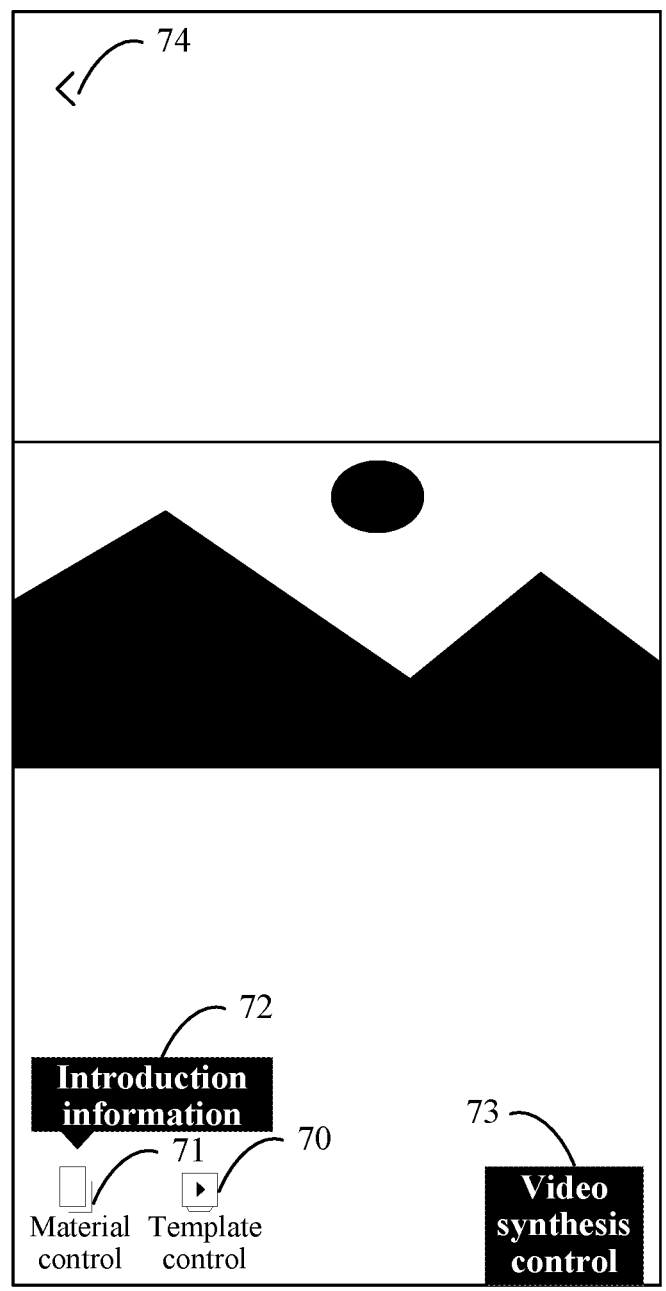
FIG. 7 is a diagram of a preview page according to an embodiment of the present disclosure.

For example, after the target video template and the material corresponding to each material slot of the target video template are loaded, the current display page may be switched from the loading page to the preview page, as shown in FIG. 7, and the to-be-synthesized material in the target video template is displayed in the preview page. For example, all to-be-synthesized material is displayed in sequence according to the sequence of all the to-be-synthesized material in the target video template. Alternatively, the to-be-synthesized material currently displayed on the preview page is switched according to the switching operation of the user. In this manner, the user specifies the material used for generating the target video and the arrangement sequence of all material.

In S206, a second trigger operation applied to the template control in the preview page is received.

In S207, in response to the second trigger operation, a template window is displayed. A piece of template information of each video template is displayed in the template window.

The second trigger operation may be an operation for triggering the template control displayed in the preview page, for example, a click operation applied to the template control. The template information of the video template may be related information of the video template, such as the template cover and/or the template name of the video template. The template window may be used to display a template list. The template list may include all video templates in the template library and may also include only a template in which the matching degree between the second music feature information of the background music and the first music feature information of the target music is greater than a set matching degree threshold value. This is not limited in this embodiment.

Figure 8:
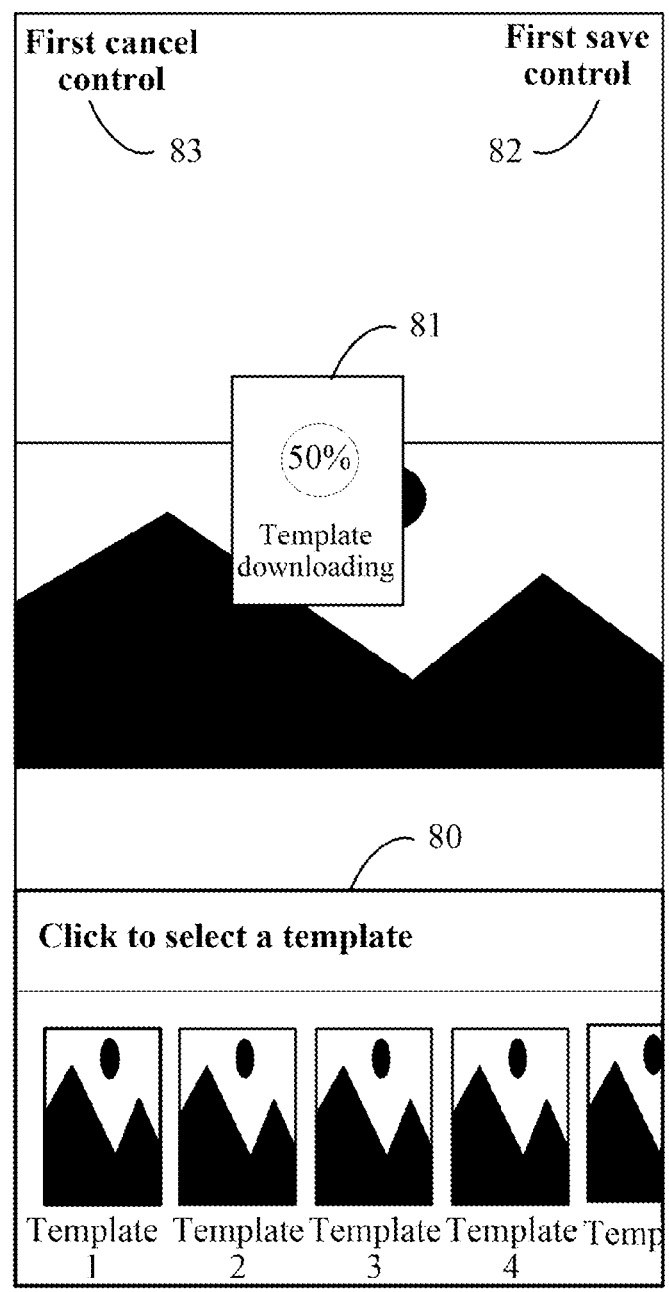
FIG. 8 is a diagram of a template window according to an embodiment of the present disclosure.

In this embodiment, as shown in FIG. 7, a template control 70 for the user to instruct the electronic device to display the template window may be disposed in the preview page. In this manner, when the user wants to change the target video template used for generating the target video, the user may click the template control 70. Accordingly, when the electronic device monitors that the user clicks the template control 70, it may be determined that the second trigger operation is received. In response to the second trigger operation, the template window 80 is displayed. The template information of each video template is displayed in the template window 80, for example, the template cover and/or template name of each video template is displayed in the template window, as shown in FIG. 8. Thus, each video template may be displayed in the template window 80 randomly or in descending order of matching degree between the second music feature information of the background music and the first music feature information of the target music.

In S208, the third trigger operation applied to a piece of template information corresponding to the third trigger operation and displayed in the template window is received.

In S209, in response to the third trigger operation, the target video template is switched to a video template to which the piece of template information corresponding to the third trigger operation belongs, and the at least one to-be-synthesized material in the target video template is updated.

The third trigger operation may be understood as an operation applied in the display area of the template information of a video template in the template window, for example, an operation of clicking the template cover of a video template displayed in the template window.

As shown in FIG. 8, when the user wants to switch the target video template to another video template, the user may click the cover of the video template displayed in the template window 80. Accordingly, when the electronic device monitors that the user clicks the template cover of a video template displayed in the video template, it may be determined that the third trigger operation is received. The target video template is switched to this video template. The target candidate template of the video template is determined according to the correlation between the material theme of each candidate material in the candidate material set of the user and the template theme of the video template. The target candidate material satisfying a filling condition of the multiple material slots of the video template is sequentially acquired and used as the to-be-filled material of the material slots. The to-be-filled material of each material slot is filled in the corresponding material slot, and the to-be-synthesized material displayed in the preview page is updated to the to-be-synthesized material in the video template, so that the user can view the updated to-be-synthesized material. Moreover, when the electronic device receives the third trigger operation, in response to the trigger operation, the electronic device may also display a download prompt window 81 to prompt the user that a template is currently downloaded. At this time, accordingly, when the updated to-be-synthesized material is displayed in the preview page, the prompt window 81 may be stopped displaying to prevent the user from being blocked from viewing the updated to-be-synthesized material.

In addition, continuing to refer to FIG. 8, after the target video template is switched, a first save control 82 and a first cancel control 83 may be displayed in the preview page. In this manner, when it is monitored that the user clicks the first save control 82, the switched target video template and to-be-synthesized material may be saved, and the template window 80 may be closed, as shown in FIG. 7. When it is monitored that the user clicks the first cancel control 83, the switched target video template and to-be-synthesized material may be switched back to the previous target video template and to-be-synthesized material, and the template window 80 may be closed, as shown in FIG. 7.

Figure 9:
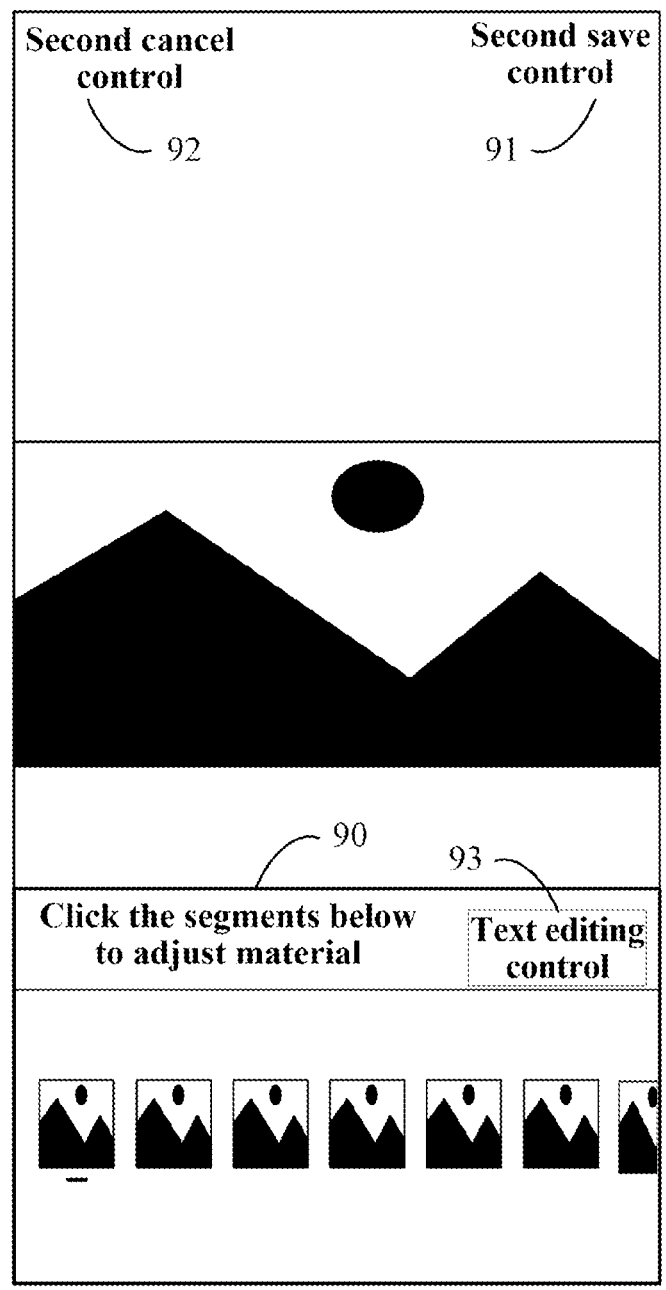
FIG. 9 is a diagram of a material window according to an embodiment of the present disclosure.

In an embodiment, referring to FIG. 7, the preview page may also display a material control 71 and may display the introduction information 72 of the function of the material control 71 when the user first enters the preview page. When the user wants to replace the to-be-filled material filled in the target video template, the user may click the material control 71. Accordingly, when the electronic device monitors that the user clicks the material control 71, a material window 90 may be displayed, and the material information of the user's material, candidate material, or target candidate material is displayed in the material window 90, for example, a material cover, as shown in FIG. 9. A second save control 91 and a second cancel control 92 may be displayed in the preview page.

Figure 10:
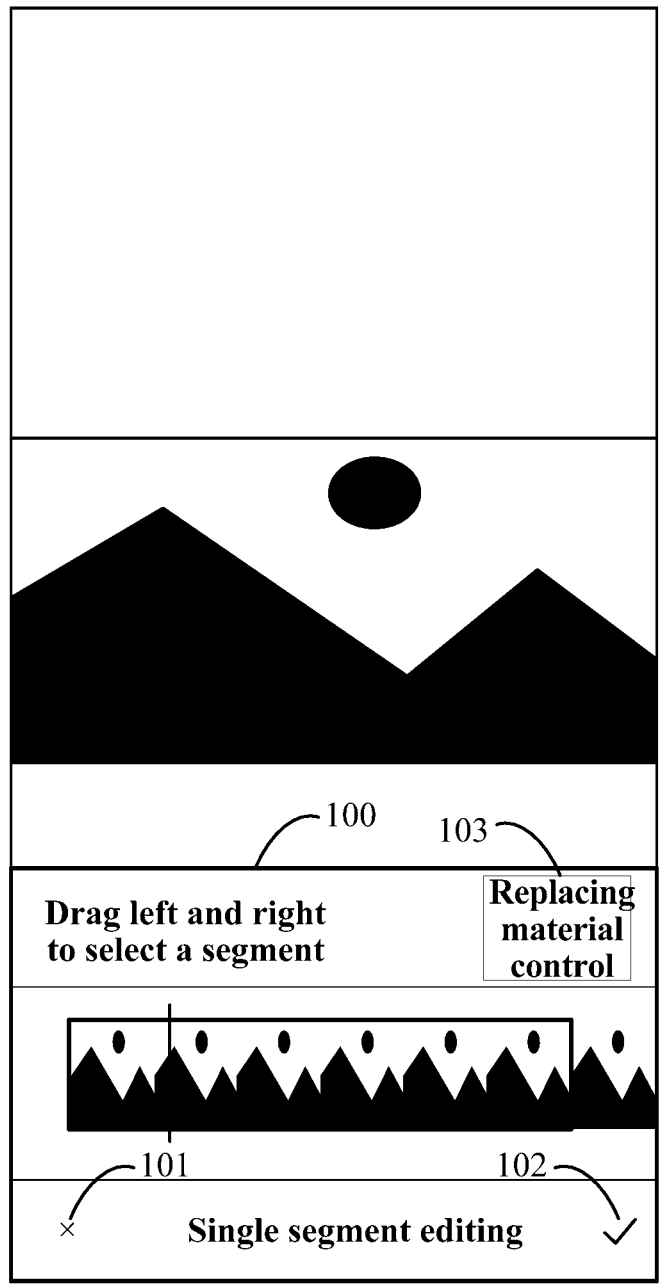
FIG. 10 is a diagram of a material editing window according to an embodiment of the present disclosure.

Thus, when the user wants to replace the material currently displayed in the preview page with another material, the user may click the cover of another material displayed in the material window 90. When the electronic device monitors that the user clicks the material cover of material displayed in the material window 90, if the material is a picture, the material displayed in the preview page at the current moment may be replaced by the picture. If the material is a video, as shown in FIG. 10, a video material editing window 100 may be displayed for the user to select a segment in the video and use the segment as the material. When it is monitored that the user clicks a determination control 102 in the video material editing window 100, the material displayed in the preview page at the current moment may be replaced by the segment selected by the user. When it is monitored that the user clicks a cancel control 101 in the video material editing window 100, the segment selected by the user is canceled. Moreover, when it is monitored that the user clicks a replacing material control 103 in the video material editing window 100, the video material editing window 100 is closed, and the material window 90 is displayed. In this manner, the user can replace material.

When the user wants to save the modification to the material, the user may click the second save control 91. Accordingly, when the electronic device monitors that the user clicks the second save control 91, the electronic device may save the modified to-be-filled material and may close the material window 90. When the user wants to cancel the modification to the material, the user may click the second cancel control 92. Accordingly, when the electronic device monitors that the user clicks the second cancel control 92, the modified to-be-synthesized material may be switched back to the previous to-be-synthesized material, and the material window 90 may be closed, as shown in FIG. 7.

In addition, a text editing control 93 for the user to edit the text carried in the target template may be displayed in the material window 90. When the electronic device may fill the to-be-filled material in the target video template, the electronic device may synchronously fill the text carried in the target video template that needs to be displayed in the video in a corresponding picture or video frame. When it is monitored that the user clicks the text editing control 93 in the material window 90, the text editing window is displayed for the user to edit the text added in the picture or video frame and carried in the target video template.

In S210, the target video is generated according to the target video template filled with the to-be-filled material.

For example, after the to-be-filled material in each material slot of the target video template is filled, the electronic device may automatically generate the target video according to the filled target video template, for example, all the to-be-filled material/to-be-synthesized material is synthesized into the target video according to the sequence of all the to-be-filled material/to-be-synthesized material in the target video template. After all the to-be-filled material in the material slots of the target video template is filled, the preview page is displayed, so that the user may view and modify the target video template and the to-be-filled material/to-be-synthesized material in the target video template and synthesize all the to-be-filled material/to-be-synthesized material in the target video template into the target video when it is monitored that the user triggers a video synthesis control in the preview page. For example, the target video is generated according to the target video template filled with the to-be-filled material in the following manners: When a fourth trigger operation of the video synthesis control applied to the preview page is received, the target music is used as the background music, and all to-be-synthesized material is synthesized as the target video according to the sequence of the all to-be-synthesized material in the target video template.

Figure 11:
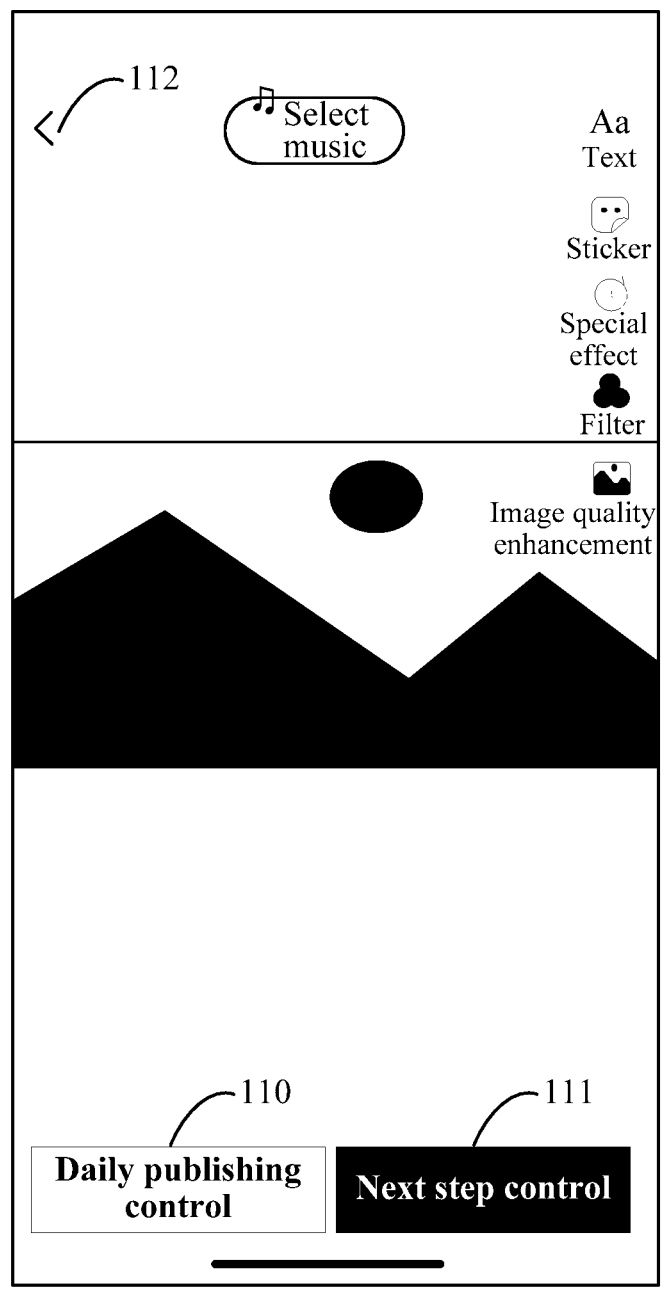
FIG. 11 is a diagram of a video editing page according to an embodiment of the present disclosure.

For example, continuing to refer to FIG. 7, the electronic device displays the video synthesis control 73 in the preview page. When the user wants to synthesize the to-be-synthesized material in the target video template as the target video, the user may click the video synthesis control 73. Accordingly, when the electronic device monitors that the user clicks the video synthesis control 73, it may be determined that the fourth trigger operation is received. In response to the fourth trigger operation, the target music is used as the background music, and all to-be-synthesized material is synthesized as the target video according to the sequence of all the to-be-synthesized material in the target video template. As shown in FIG. 11, the current display page may be switched from the preview page to a video editing page for the user to edit the synthesized target video, such as replacing the background music of the target video, adding text, stickers, special effects and/or filters to the target video, or performing image enhancement on the target video. When it is monitored that the user clicks a daily publishing control 110 in the video editing page, the target video is published, and the target video is set to be visible only within a preset number of days (such as one day or one week). When it is monitored that the user clicks a next step control 111 in the video editing page, the current display page is switched from the video editing page to a publishing page for the user to edit the title, publishing position, and visual range of the target video and publish the target video or save the target video in a draft box. If to-be-synthesized material is material of a video type, during synthesis, the audio data of the to-be-synthesized material may be deleted, or the to-be-synthesized material may be muted. In this manner, the sudden appearance or disappearance of sounds other than the target music in the obtained target video is avoided.

In addition, as shown in FIG. 7, a first return control 74 may also be displayed in the preview page. Thus, when the user wants to return to the music detail page of the target music, the user may click the first return control 74. Accordingly, when the electronic device monitors that the user clicks the first return control 74, the electronic device may display a first save prompt window (not shown in FIG. 7) to prompt the user that the current effect is lost after returning. When it is monitored that the user clicks a first confirmation control in the first save prompt window, the current display page is switched from the preview page to the music detail page of the target music. As shown in FIG. 11, a second return control 112 may also be displayed in the video editing page. Thus, when the user wants to return to the preview page, the user may click the second return control 112. Accordingly, when the electronic device monitors that the user clicks the second return control 112, the electronic device may display a second save prompt window (not shown in FIG. 11) to prompt the user that the content edited in the video editing page is not saved. When it is monitored that the user clicks a second confirmation control in the second save prompt window, the current display page is switched from the video editing page to the preview page.

In the video generation method according to this embodiment, the target video template is selected according to the music feature of the target video. The target candidate material is determined according to the theme of the target video template. After the user changes the target video template, the material filled in the target video template is updated synchronously. In this manner, not only a video can be automatically generated according to the music selected by the user, but also the quality of the generated target video can be improved. Moreover, the generated target video is more consistent with the user's wishes, thereby improving the user experience.

Figure 12:
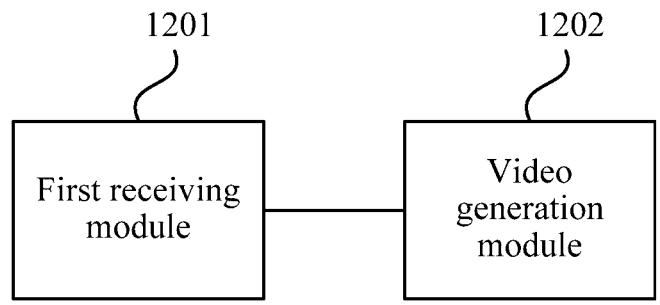
FIG. 12 is a block diagram illustrating the structure of a video generation apparatus according to an embodiment of the present disclosure.

FIG. 12 is a block diagram illustrating the structure of a video generation apparatus according to an embodiment of the present disclosure. The apparatus may be performed by software and/or hardware and may be configured in an electronic device. For example, the apparatus may be configured in a mobile phone or a tablet computer and can generate a video by executing a video generation method. As shown in FIG. 12, the video generation apparatus provided by this embodiment may include a first receiving module 1201 and a video generation module 1202.

The first receiving module 1201 is configured to receive the first trigger operation of generating the video using the target music. The video generation module 1202 is configured to, in response to the first trigger operation, select the candidate material matching the target music from the candidate material set of the user, use the candidate material as the target candidate material according to the first music feature information of the target music, and generate the target video according to the target candidate material. The target video uses the target music as the background music.

In the video generation apparatus according to this embodiment, the first receiving module 1201 receives the first trigger operation of generating the video using the target music. The video generation module 1202, in response to the first trigger operation, selects the candidate material matching the target music from the candidate material set of the user, uses the candidate material as the target candidate material according to the first music feature information of the target music, and generates the target video that uses the target music as the background music according to the target candidate material. In the preceding technical solutions adopted by this embodiment, the video may be automatically generated according to the music selected by the user by using the material matching the music. In this manner, the creation threshold of a video can be reduced, and the time required for creating the video by the user can be shortened. Moreover, the matching degree between the generated video and the music selected by the user can be improved, and the quality of the generated video can be improved.

In the preceding solutions, the video generation module 1202 may include a template acquisition unit and a material determination unit. The template acquisition unit is configured to acquire the second music feature information of the background music of each video template, select the video template in which the second music feature information matches the first music feature information of the target music, and use the video template as the target video template. The material determination unit is configured to determine the target candidate material according to the correlation between the material theme of each candidate material in the candidate material set of the user and the template theme of the target video template.

In the preceding solutions, the target video template may include multiple material slots for filling material. The video generation module 1202 may also include a material filling unit and a video generation unit. The material filling unit is configured to, after the target candidate material is determined according to the correlation between the material theme of each candidate material in the candidate material set of the user and the template theme of the target video template, sequentially acquire the target candidate material satisfying the filling condition of each material slot of the target video template, use the target candidate material as the to-be-filled material in the material slot, and fill the to-be-filled material in each material slot. The video generation unit is configured to generate the target video according to the target video template filled with the to-be-filled material.

In the preceding solutions, the video generation module 1202 may also include a material display unit. The material display unit is configured to, after the to-be-filled material is filled in the material slot, display the preview page and display the to-be-synthesized material in the target video template in the preview page. The to-be-synthesized material includes multiple pieces of to-be-filled material.

In the preceding solutions, the video generation module 1202 may also include a first receiving unit, a template display unit, a second receiving unit, and a material updating unit. The first receiving unit is configured to, after the preview page is displayed, receive the second trigger operation applied to the template control in the preview page. The template display unit is configured to, in response to the second trigger operation, display the template window. The template information of multiple video templates is displayed in the template window. The second receiving unit is configured to receive the third trigger operation applied to the template information displayed in the template window. The material updating unit is configured to, in response to the third trigger operation, switch the target video template to the video template to which the template information corresponding to the third trigger operation belongs and update the to-be-synthesized material in the target video template.

In the preceding solutions, the video generation unit may be configured to, when the fourth trigger operation of the video synthesis control applied to the preview page is received, use the target music as the background music and synthesize all to-be-synthesized material as the target video according to the sequence of the all to-be-synthesized material in the target video template.

The video generation apparatus according to this embodiment may also include a material acquisition module and a material screening module. The material acquisition module is configured to, before the candidate material matching the target music is selected from the candidate material set of the user and used as the target candidate material, acquire the material in the album of the user. The album includes a local album or an associated cloud album. The material screening module is configured to, select multiple pieces of material from the album according to the aesthetic score of the material to form the candidate material set of the user.

The video generation apparatus provided by this embodiment of the present disclosure may execute the video generation method provided by any embodiment of the present disclosure and has functional modules and beneficial effects corresponding to the video generation method executed. For technical details not described in detail in this embodiment, reference may be made to the video generation method provided by any embodiment of the present disclosure.

Figure 13:
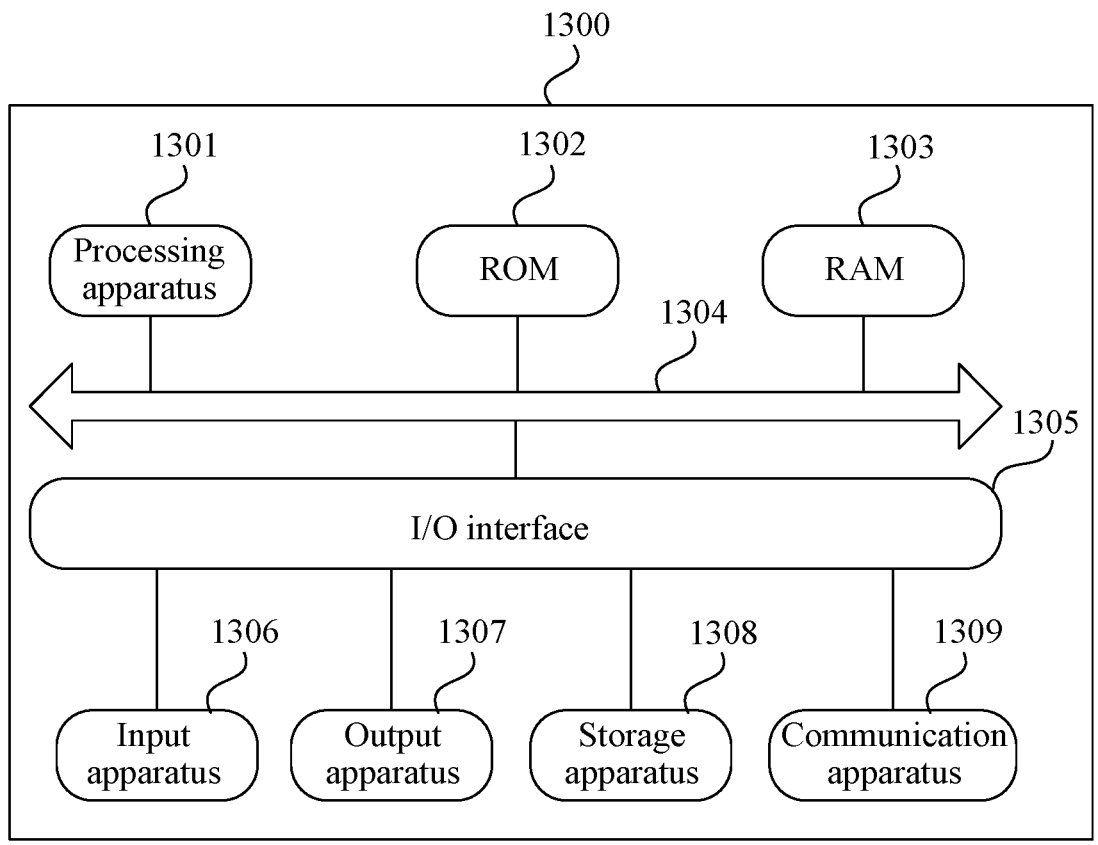
FIG. 13 is a diagram illustrating the structure of an electronic device according to an embodiment of the present disclosure.

Referring to FIG. 13, FIG. 7 shows a diagram illustrating the structure of an electronic device 1300 (for example, a terminal device) applicable to implementing embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable multimedia player (PMP) and an in-vehicle terminal (such as an in-vehicle navigation terminal), and stationary terminals such as a digital television (TV) and a desktop computer. The electronic device shown in FIG. 13 is merely an example and is not intended to limit the function and usage scope of the embodiments of the present disclosure.

As shown in FIG. 13, the electronic device 1300 may include a processing apparatus (such as a central processing unit and a graphics processing unit) 1301. The processing apparatus 1301 may execute multiple appropriate actions and processing according to a program stored in a read-only memory (ROM) 1302 or a program loaded into a random-access memory (RAM) 1303 from a storage apparatus 1308. The RAM 1303 also stores various programs and data required for the operation of the electronic device 1300. The processing apparatus 1301, the ROM 1302, and the RAM 1303 are connected to each other through a bus 1304. An input/output (I/O) interface 1305 is also connected to the bus 1304.

Generally, the following apparatuses may be connected to the I/O interface 1305: an input apparatus 1306 such as a touch screen, a touch pad, a keyboard, a mouse, a camera, a microphone, an accelerometer and a gyroscope; an output apparatus 1307 such as a liquid crystal display (LCD), a speaker and a vibrator; the storage apparatus 1308 such as a magnetic tape and a hard disk; and a communication apparatus 1309. The communication apparatus 1309 may allow the electronic device 1300 to perform wireless or wired communication with other devices to exchange data. Although FIG. 13 shows the electronic device 1300 having various apparatuses, not all the apparatuses shown here need to be implemented or present. Alternatively, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 1309, or may be installed from the storage apparatus 1308, or may be installed from the ROM 1302. When the computer program is executed by the processing apparatus 1301, the preceding functions defined in the method of the embodiments of the present disclosure are executed.

The computer-readable medium described above in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device, or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area networks (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The preceding computer-readable medium carries one or more programs. When the one or more programs are executed by the electronic device, the electronic device is configured to receive the first trigger operation of generating the video using the target music; and in response to the first trigger operation, select the candidate material matching the target music from the candidate material set of the user, use the candidate material as the target candidate material according to the first music feature information of the target music, and generate the target video according to the target candidate material. The target video uses the target music as the background music.

Computer program codes for performing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions, and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a module is not intended to limit the unit in a certain circumstance.

The functions described above herein may be executed, at least partially, by one or more hardware logic components. For example, without limitation, exemplary types of hardware logic components that may be used include: a field programmable gate array (FPGA), an application specific integrated circuit (ASIC), application specific standard parts (ASSP), a System-on-a-Chip (SOC), and a complex programmable logic device (CPLD).

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection according to one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, example 1 provides a video generation method. The method includes the steps below.

The first trigger operation of generating the video using the target music is received.

In response to the first trigger operation, the candidate material matching the target music is selected from the candidate material set of the user and used as the target candidate material according to the first music feature information of the target music. The target video is generated according to the target candidate material. The target video uses the target music as the background music.

According to one or more embodiments of the present disclosure, in example 2, according to the method described in example 1, the candidate material matching the target music is selected from the candidate material set of the user and used as the target candidate material according to the first music feature information of the target music in the manners below.

The second music feature information of the background music of each video template is acquired, and the video template in which the second music feature information matches the first music feature information of the target music is selected and used as the target video template.

The target candidate material is determined according to the correlation between the material theme of each candidate material in the candidate material set of the user and the template theme of the target video template.

According to one or more embodiments of the present disclosure, in example 3, according to the method described in example 2, the target video template includes multiple material slots for filling material. After the target candidate material is determined according to the correlation between the material theme of each candidate material in the candidate material set of the user and the template theme of the target video template, the method also includes the steps below.

The target candidate material satisfying the filling condition of each material slot of the target video template is sequentially acquired and used as the to-be-filled material in the material slot. The to-be-filled material is filled in the material slot.

The target video is generated according to the target candidate material in the manner below.

The target video is generated according to the target video template filled with the to-be-filled material.

According to one or more embodiments of the present disclosure, in example 4, according to the method described in example 3, after the to-be-filled material is filled in the material slot, the method also includes the steps below.

The preview page is displayed, and the to-be-synthesized material in the target video template is displayed in the preview page. The to-be-synthesized material includes the to-be-filled material.

According to one or more embodiments of the present disclosure, in example 5, according to the method described in example 4, after the preview page is displayed, the method also includes the steps below.

The second trigger operation applied to the template control in the preview page is received.

In response to the second trigger operation, the template window is displayed. The template information of multiple video templates is displayed in the template window.

The third trigger operation applied to the template information displayed in the template window is received.

In response to the third trigger operation, the target video template is switched to the video template to which the template information corresponding to the third trigger operation belongs, and the to-be-synthesized material in the target video template is updated.

According to one or more embodiments of the present disclosure, in example 6, according to the method described in example 4 or 5, the target video is generated according to the target video template filled with the to-be-filled material in the manners below.

When the fourth trigger operation of the video synthesis control applied to the preview page is received, the target music is used as the background music, and all to-be-synthesized material is synthesized as the target video according to the sequence of the all to-be-synthesized material in the target video template.

According to one or more embodiments of the present disclosure, example 7, according to the method described in any one of examples 1 to 5, before the candidate material matching the target music is selected from the candidate material set of the user and used as the target candidate material, the method also includes the steps below.

The material in the album of the user is acquired. The album includes a local album or an associated cloud album.

Multiple pieces of material are selected from the album according to the aesthetic score of the material to form the candidate material set of the user.

According to one or more embodiments of the present disclosure, example 8 provides a video generation apparatus. The apparatus includes a first receiving module and a video generation module.

The first receiving module is configured to receive the first trigger operation of generating the video using the target music.

The video generation module is configured to, in response to the first trigger operation, select the candidate material matching the target music from the candidate material set of the user, use the candidate material as the target candidate material according to the first music feature information of the target music, and generate the target video according to the target candidate material.

According to one or more embodiments of the present disclosure, example 9 provides an electronic device. The device includes one or more processors and a memory.

The memory is configured to store one or more programs.

When executing the one or more programs, the one or more processors perform the video generation method according to any one of examples 1 to 7.

According to one or more embodiments of the present disclosure, example 10 provides a computer-readable storage medium. The storage medium stores a computer program. When executing the program, a processor performs the video generation method according to any one of examples 1 to 7.

In addition, although multiple operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable subcombination.

What is claimed is:

1. A video generation method, comprising:
  receiving a first trigger operation of generating a video using target music; and
  in response to the first trigger operation, selecting candidate material matching the target music from a candidate material set of a user according to first music feature information of the target music, using the candidate material as target candidate material, and generating a target video according to the target candidate material, wherein the target video uses the target music as background music,
  wherein selecting the candidate material matching the target music from the candidate material set of the user according to the first music feature information of the target music and using the candidate material as the target candidate material comprises:
  acquiring second music feature information of background music of each of a plurality of video templates, selecting a video template from the plurality of video template, and using the video template as a target video template, wherein second music feature information in the selected video template matches the first music feature information of the target music; and
  determining the target candidate material according to a correlation between a material theme of each candidate material in the candidate material set of the user and a template theme of the target video template, and
  wherein the second music feature information comprises at least one of rhythm information and music style information of background music.

2. The method according to claim 1, wherein the target video template comprises a plurality of material slots for filling material, and
  after determining the target candidate material according to the correlation between the material theme of the each candidate material in the candidate material set of the user and the template theme of the target video template, the method further comprises: sequentially acquiring target candidate material satisfying a filling condition of the plurality of material slots of the target video template, using target candidate material corresponding to each material slot of the plurality of material slots as to-be-filled material in each material slot, and filling the to-be-filled material in each material slot of the target video template; and
  generating the target video according to the target candidate material comprises: generating the target video according to the target video template filled with the to-be-filled material.

3. The method according to claim 2, after filling the to-be-filled material in each material slot of the target video template, further comprising:
  displaying a preview page and displaying at least one piece of to-be-synthesized material in the target video template in the preview page, wherein the at least one to-be-synthesized material comprises the to-be-filled material.

4. The method according to claim 3, after displaying the preview page, further comprising:
  receiving a second trigger operation applied to a template control in the preview page;
  in response to the second trigger operation, displaying a template window, wherein a piece of template information of each of the plurality of video templates is displayed in the template window;
  receiving a third trigger operation applied to a piece of template information corresponding to the third trigger operation and displayed in the template window; and
  in response to the third trigger operation, switching the target video template to a video template to which the piece of template information corresponding to the third trigger operation belongs and updating the at least one to-be-synthesized material in the target video template.

5. The method according to claim 3, wherein generating the target video according to the target video template filled with the to-be-filled material comprises:
  in a case where a fourth trigger operation of a video synthesis control applied to the preview page is received, using the target music as the background music and synthesizing the at least one to-be-synthesized material as the target video according to sequences of the at least one to-be-synthesized material in the target video template.

6. The method according to claim 4, wherein generating the target video according to the target video template filled with the to-be-filled material comprises:
  in a case where a fourth trigger operation of a video synthesis control applied to the preview page is received, using the target music as the background music and synthesizing the at least one to-be-synthesized material as the target video according to sequences of the at least one to-be-synthesized material in the target video template.

7. The method according to claim 1, before selecting the candidate material matching the target music from the candidate material set of the user and using the candidate material as the target candidate material, further comprising:
  acquiring material in an album of the user, wherein the album comprises at least one of a local album or an associated cloud album; and
  selecting a plurality of pieces of material from the album according to an aesthetic score of material to form the candidate material set of the user.

8. An electronic device, comprising:
  at least one processor; and
  a memory configured to store at least one program,
  wherein when executing the at least one program, the at least one processor performs:
  receiving a first trigger operation of generating a video using target music; and
  in response to the first trigger operation, selecting candidate material matching the target music from a candidate material set of a user according to first music feature information of the target music, using the candidate material as target candidate material, and generating a target video according to the target candidate material, wherein the target video uses the target music as background music,
  wherein the at least one processor is configured to select the candidate material matching the target music from the candidate material set of the user according to the first music feature information of the target music and use the candidate material as the target candidate material by:
  acquiring second music feature information of background music of each of a plurality of video templates, selecting a video template from the plurality of video template, and using the video template as a target video template, wherein second music feature information in the selected video template matches the first music feature information of the target music; and determining the target candidate material according to a correlation between a material theme of each candidate material in the candidate material set of the user and a template theme of the target video template, and wherein the second music feature information comprises at least one of rhythm information and music style information of background music.

9. The electronic device according to claim 8, wherein the target video template comprises a plurality of material slots for filling material, and after determining the target candidate material according to the correlation between the material theme of the each candidate material in the candidate material set of the user and the template theme of the target video template, the at least one processor is further configured to perform: sequentially acquiring target candidate material satisfying a filling condition of the plurality of material slots of the target video template, using target candidate material corresponding to each material slot of the plurality of material slots as to-be-filled material in each material slot, and filling the to-be-filled material in each material slot of the target video template; and generating the target video according to the target candidate material comprises: generating the target video according to the target video template filled with the to-be-filled material.

10. The electronic device according to claim 9, after filling the to-be-filled material in each material slot of the target video template, the at least one processor is further configured to perform:

displaying a preview page and displaying at least one piece of to-be-synthesized material in the target video template in the preview page, wherein the at least one to-be-synthesized material comprises the to-be-filled material.

11. The electronic device according to claim 10, after displaying the preview page, the at least one processor is further configured to perform:

receiving a second trigger operation applied to a template control in the preview page;

in response to the second trigger operation, displaying a template window, wherein a piece of template information of each of the plurality of video templates is displayed in the template window;

receiving a third trigger operation applied to a piece of template information corresponding to the third trigger operation and displayed in the template window; and in response to the third trigger operation, switching the target video template to a video template to which the piece of template information corresponding to the third trigger operation belongs and updating the at least one to-be-synthesized material in the target video template.

12. The electronic device according to claim 10, wherein the at least one processor is configured to generate the target video according to the target video template filled with the to-be-filled material by:

in a case where a fourth trigger operation of a video synthesis control applied to the preview page is received, using the target music as the background music and synthesizing the at least one to-be-synthesized material as the target video according to sequences of the at least one to-be-synthesized material in the target video template.

13. The electronic device according to claim 11, wherein the at least one processor is configured to generate the target video according to the target video template filled with the to-be-filled material by:

in a case where a fourth trigger operation of a video synthesis control applied to the preview page is received, using the target music as the background music and synthesizing the at least one to-be-synthesized material as the target video according to sequences of the at least one to-be-synthesized material in the target video template.

14. The electronic device according to claim 8, before selecting the candidate material matching the target music from the candidate material set of the user and using the candidate material as the target candidate material, the at least one processor is further configured to perform:

acquiring material in an album of the user, wherein the album comprises at least one of a local album or an associated cloud album; and selecting a plurality of pieces of material from the album according to an aesthetic score of material to form the candidate material set of the user.

15. A non-transitory computer-readable storage medium, storing a computer program, wherein when executing the program, a processor performs:

receiving a first trigger operation of generating a video using target music; and in response to the first trigger operation, selecting candidate material matching the target music from a candidate material set of a user according to first music feature information of the target music, using the candidate material as target candidate material, and generating a target video according to the target candidate material, wherein the target video uses the target music as background music, wherein the processor is configured to select the candidate material matching the target music from the candidate material set of the user according to the first music feature information of the target music and use the candidate material as the target candidate material by:

acquiring second music feature information of background music of each of a plurality of video templates, selecting a video template from the plurality of video template, and using the video template as a target video template, wherein second music feature information in the selected video template matches the first music feature information of the target music; and determining the target candidate material according to a correlation between a material theme of each candidate material in the candidate material set of the user and a template theme of the target video template, and wherein the second music feature information comprises at least one of rhythm information and music style information of background music.

16. The non-transitory computer-readable storage medium according to claim 15, wherein the target video template comprises a plurality of material slots for filling material, and after determining the target candidate material according to the correlation between the material theme of the each candidate material in the candidate material set of the user and the template theme of the target video template, the processor is further configured to perform: sequentially acquiring target candidate material satisfying a filling condition of the plurality of material slots of the target video template, using target candidate material corresponding to each material slot of the plurality of material slots as to-be-filled material in each material slot, and filling the to-be-filled material in each material slot of the target video template; and generating the target video according to the target candidate material comprises: generating the target video according to the target video template filled with the to-be-filled material.

17. The non-transitory computer-readable storage medium according to claim 16, after filling the to-be-filled material in each material slot of the target video template, the processor is further configured to perform:

displaying a preview page and displaying at least one piece of to-be-synthesized material in the target video template in the preview page, wherein the at least one to-be-synthesized material comprises the to-be-filled material.

* * * * *